(12) United States Patent
LaVerdure et al.

(10) Patent No.: US 12,450,105 B1
(45) Date of Patent: *Oct. 21, 2025

(54) MULTI-SYSTEM INTEGRATION AND COOPERATIVE MULTI-SYSTEM OPERATIONS IN CONFORMANCE WITH ADAPTIVE PROTOCOLS

(71) Applicant: THE HUNTINGTON NATIONAL BANK, Columbus, OH (US)

(72) Inventors: Thomas LaVerdure, Columbus, OH (US); Brian James Stocker, Columbus, OH (US)

(73) Assignee: THE HUNTINGTON NATIONAL BANK, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/982,548

(22) Filed: Dec. 16, 2024

(51) Int. Cl.
G06F 3/00 (2006.01)
G06F 9/451 (2018.01)
G06F 9/54 (2006.01)

(52) U.S. Cl.
CPC ............... *G06F 9/54* (2013.01); *G06F 9/451* (2018.02)

(58) Field of Classification Search
CPC ........................................................ G06F 9/50
See application file for complete search history.

(56) References Cited

U.S. PATENT DOCUMENTS

| | | | |
|---|---|---|---|
| 7,194,637 B1 * | 3/2007 | Crawford | H04L 63/10 713/153 |
| 8,938,800 B2 * | 1/2015 | Bhargava | H04L 63/20 726/22 |
| 9,660,959 B2 * | 5/2017 | Hsu | H04L 63/1425 |
| 10,681,072 B2 * | 6/2020 | Alfano | H04L 43/0876 |
| 2013/0061335 A1 * | 3/2013 | Schwabe | G06F 21/6218 726/28 |
| 2021/0083967 A1 * | 3/2021 | Joshi | H04L 41/0659 |

(Continued)

OTHER PUBLICATIONS

Jérôme Euzenat, Uncertainty in crowdsourcing ontology matching. (Year: 2013).*

(Continued)

*Primary Examiner* — Lechi Truong
(74) *Attorney, Agent, or Firm* — Kilpatrick Townsend & Stockton LLP

(57) ABSTRACT

System, methods, and machine-readable media may facilitate multi-system integration and cooperative multi-system operations in conformance with adaptive protocols. A partial system integration of a remote system with an integration infrastructure may be defined. Integration specifications may be generated and transmitted to the remote system to facilitate the partial system integration. A defined event may be detected and mapped to the remote system. An implementation of a protocol may define an operation flow in response to the detection. References to the integration specifications previously transmitted to the remote system may be transmitted. Responses may be received from the remote system, and it may be determined whether the responses conform to parameter constraints of the protocol. Upon determination that the responses to the transmitting of the references satisfy that parameter constraints, access to a resource facilitated by the integration infrastructure may be controlled in accordance with the protocol.

17 Claims, 6 Drawing Sheets

(56) References Cited

U.S. PATENT DOCUMENTS

| | | | |
|---|---|---|---|
| 2021/0240734 A1* | 8/2021 | Shah | G06F 8/63 |
| 2021/0397522 A1* | 12/2021 | Owen | G06F 16/128 |
| 2022/0191249 A1* | 6/2022 | Luciano | H04L 63/10 |

OTHER PUBLICATIONS

Kevin Bierhoff, Practical API Protocol Checking with Access Permissions. (Year: 2009).*

* cited by examiner

MULTI-SYSTEM INTEGRATION AND COOPERATIVE MULTI-SYSTEM OPERATIONS IN CONFORMANCE WITH ADAPTIVE PROTOCOLS

TECHNICAL FIELD

This disclosure generally relates to cooperative multi-system operations, and more particularly to systems, methods, and non-transitory, computer-readable media to facilitate multi-system integration and cooperative multi-system operations in conformance with adaptive protocols.

BACKGROUND

Cooperative multi-system operations over networks and in various locations around the world can be encumbered by various needs, such as needs associated with various events, various user devices, various accesses to resources, various service requests, various service provisioning, etc. The inflexibility of conventional systems can require substantial, resource-consuming effort and time to address various needs and contexts. This, coupled with the lack of speed with which conventional system are able to address various needs, compromises outcomes for collections of systems and user devices. Thus, there is a need for systems and methods that address complexities, increase efficiencies, decrease errors, increase speeds, and otherwise improve cooperative multi-system operations. These and other needs are addressed by the present disclosure.

BRIEF SUMMARY

Certain embodiments according to the present disclosure relate generally to cooperative multi-system operations, and more particularly to systems, methods, and non-transitory, computer-readable media to facilitate multi-system integration and cooperative multi-system operations in conformance with adaptive protocols.

In one aspect, a system may facilitate multi-system integration and cooperative multi-system operations in conformance with adaptive protocols. The system may include one or more processing devices and memory communicatively coupled with and readable by the one or more processing devices. The memory may include processor-readable instructions which, when executed by the one or more processing devices, cause the system to perform one or a combination of the following operations. Content may be provided to facilitate a user interface that may be exposed to a plurality of remote systems communicatively couplable with the system. Each remote system of the plurality of remote systems may be located remotely from the system and may be configured to perform different types of operations according to operation requests from a plurality of endpoint devices. The system may be configured to facilitate direct integration with remote systems that exposes a plurality of functionalities and data of the system. For at least one remote system of the plurality of remote systems, one or a combination of the following may be performed. One or more selections corresponding to the user interface may be received. Based at least in part on the one or more selections, a partial system integration of the at least one remote system with the system may be defined. Integration specifications particularized to facilitating use of a set of one or more functionalities by the at least one remote system after the partial system integration of the at least one remote system with the system may be generated. The integration specifications may be transmitted to the at least one remote system to facilitate the partial system integration of the at least one remote system with the system. One or more system interactions and/or one or more data changes that correspond to a defined event may be detected. The defined event may be mapped to the at least one remote system. A protocol mapped to the partial system integration that may include parameter constraints mapped to the defined event may be identified. An implementation of the protocol may be generated. The implementation of the protocol may define an operation flow that is to occur in response to the detection of the defined event, where the implementation of the protocol transforms the protocol into an executable process corresponding to use of the set of one or more functionalities by the at least one remote system. The operation flow may be performed. References to the integration specifications previously transmitted to the at least one remote system may be transmitted to the at least one remote system. Responses to the transmitting of the references may be received from the at least one remote system. Whether the responses conform to the parameter constraints of the protocol may be determined. Upon determination that the responses satisfy the parameter constraints, access to the resource facilitated by the system may be controlled in accordance with the protocol.

In another aspect, a method may facilitate multi-system integration and cooperative multi-system operations in conformance with adaptive protocols. The method may include one or a combination of the following. Content may be provided to facilitate a user interface that may be exposed to a plurality of remote systems communicatively couplable with an integration infrastructure. Each remote system of the plurality of remote systems may be located remotely from the integration infrastructure and may be configured to perform different types of operations according to operation requests from a plurality of endpoint devices. The integration infrastructure may be configured to facilitate direct integration with remote systems that exposes a plurality of functionalities and data of the integration infrastructure. For at least one remote system of the plurality of remote systems, one or a combination of the following may be performed. One or more selections corresponding to the user interface may be received. Based at least in part on the one or more selections, a partial system integration of the at least one remote system with the integration infrastructure may be defined. Integration specifications particularized to facilitating use of a set of one or more functionalities by the at least one remote system after the partial system integration of the at least one remote system with the integration infrastructure may be generated. The integration specifications may be transmitted to the at least one remote system to facilitate the partial system integration of the at least one remote system with the integration infrastructure. One or more system interactions and/or one or more data changes that correspond to a defined event may be detected. The defined event may be mapped to the at least one remote system. A protocol mapped to the partial system integration that may include parameter constraints mapped to the defined event may be identified. An implementation of the protocol may be generated. The implementation of the protocol may define an operation flow that is to occur in response to the detection of the defined event, where the implementation of the protocol transforms the protocol into an executable process corresponding to use of the set of one or more functionalities by the at least one remote system. The operation flow may be performed. References to the integration specifications previously transmitted to the at least one remote system may be transmitted to the at least one remote system. Responses to the transmitting of the references may be received from the at least one remote system. Whether the responses conform to the parameter constraints of the protocol may be determined. Upon determination that the responses satisfy the parameter constraints, access to the resource facilitated by the integration infrastructure may be controlled in accordance with the protocol.

In yet another aspect, one or more non-transitory, machine-readable media may have machine-readable instructions thereon which, when executed by one or more processing devices, cause a system to perform one or a combination of the following operations. Content may be provided to facilitate a user interface that may be exposed to a plurality of remote systems communicatively couplable with the system. Each remote system of the plurality of remote systems may be located remotely from the system and may be configured to perform different types of operations according to operation requests from a plurality of endpoint devices. The system may be configured to facilitate direct integration with remote systems that exposes a plurality of functionalities and data of the system. For at least one remote system of the plurality of remote systems, one or a combination of the following may be performed. One or more selections corresponding to the user interface may be received. Based at least in part on the one or more selections, a partial system integration of the at least one remote system with the system may be defined. Integration specifications particularized to facilitating use of a set of one or more functionalities by the at least one remote system after the partial system integration of the at least one remote system with the system may be generated. The integration specifications may be transmitted to the at least one remote system to facilitate the partial system integration of the at least one remote system with the system. One or more system interactions and/or one or more data changes that correspond to a defined event may be detected. The defined event may be mapped to the at least one remote system. A protocol mapped to the partial system integration that may include parameter constraints mapped to the defined event may be identified. An implementation of the protocol may be generated. The implementation of the protocol may define an operation flow that is to occur in response to the detection of the defined event, where the implementation of the protocol transforms the protocol into an executable process corresponding to use of the set of one or more functionalities by the at least one remote system. The operation flow may be performed. References to the integration specifications previously transmitted to the at least one remote system may be transmitted to the at least one remote system. Responses to the transmitting of the references may be received from the at least one remote system. Whether the responses conform to the parameter constraints of the protocol may be determined. Upon determination that the responses satisfy the parameter constraints, access to the resource facilitated by the system may be controlled in accordance with the protocol.

In various embodiments, the defining the partial integration may be based at least in part on defining the set of one or more functionalities of the system and/or integration infrastructure to be used by the at least one remote system after the partial integration of the at least one remote system with the system and/or integration infrastructure and identifying one or more application programming interfaces (APIs) provided by the system and/or integration infrastructure and particularized to facilitating the set of one or more functionalities. In various embodiments, target specifications of the at least one remote system to facilitate use of the one or more APIs and/or the partial system integration may be received. In various embodiments, the target specifications of the at least one remote system may be analyzed. The defining the partial integration may be further based at least in part on defining a data mapping particularized to facilitating the set of one or more functionalities. The data mapping may specify data fields that need to be transferred and how the data fields map between the system and/or integration infrastructure and the at least one remote system.

In various embodiments, the integration specifications may include specifications of interface elements and/or specifications of data needed for access to a resource facilitated by the system and/or integration infrastructure in accordance with the protocol. In various embodiments, the partial system integration may include a functional integration of the at least one remote system with the system and/or integration infrastructure. In various embodiments, the transmitting the references may cause the at least one remote system to configure an interface in accordance with the specifications of interface elements. In various embodiments, the transmitting the references may cause the at least one remote system to transmit the responses in accordance with the specifications of interface elements.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
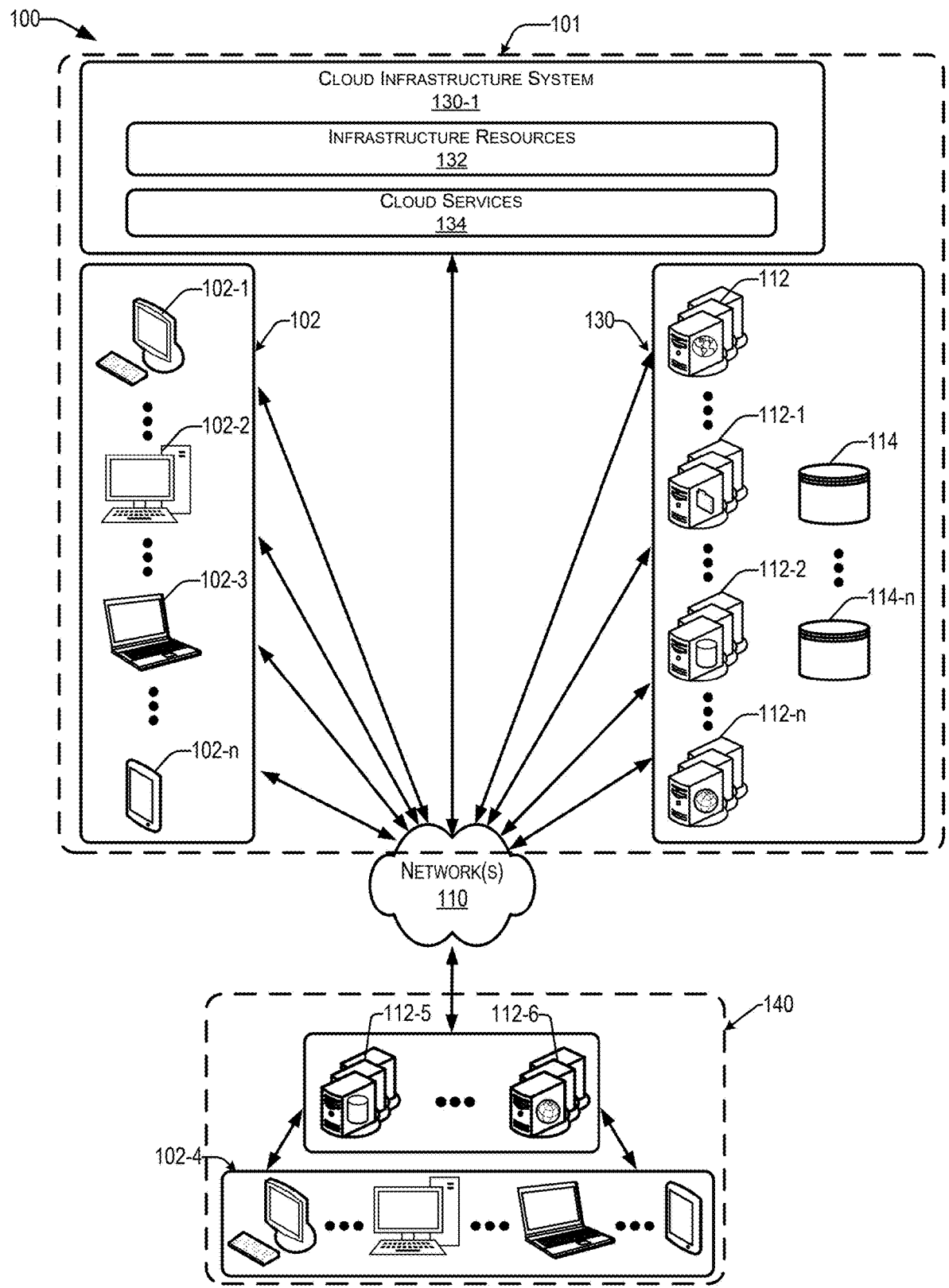
FIG. 1 illustrates computing infrastructure for implementing disclosed embodiments in accordance with present disclosure.

Various embodiments will now be disclosed in greater detail with reference to the accompanying figures, beginning with FIG. 1. FIG. 1 depicts a simplified diagram of computing infrastructure 100 for supporting and implementing disclosed embodiments in accordance with present disclosure. The computing infrastructure 100 may include an integration infrastructure 101 that may include one or more systems to facilitate multi-system integration and cooperative multi-system operations in conformance with adaptive protocols. The selection and/or arrangement of components depicted in FIG. 1 are shown only by way of example and are not meant to be limiting.

The computing infrastructure 100 may allow for controlling resource access and operations across a plurality of systems and devices. The network 100 includes a plurality of computing systems and endpoint computing devices corresponding to multiple geographic and/or virtual locations, regions, and/or domains, for instance, different geographic areas within different jurisdictions, different data centers, different networks, different computing infrastructures, etc. Various embodiments may include many such systems and endpoint devices. Each of the multiple systems may, for example, be configured to perform a different type of operation, to use different resources and/or different types of resources, to generate different types of outputs, to be located at different geographical locations, to correspond to (e.g., to grant access to) different agents or users, and so on. For brevity, the network 100 is depicted in a simplified and conceptual form, and may generally include more or fewer systems, devices, networks, and/or other components as desired. The network 100 may include several physical components and/or several virtual components such as, for example, one or several cloud computing components.

As in the illustrated embodiment, the integration infrastructure 101 may include one or more client computing devices 102, which may be configured to execute and operate a variety of applications. The applications may include, for example, a client application such as a web browser, proprietary client, or the like over one or more networks 110 that can be used for bidirectional communication paths for data transfer between components of the computing infrastructure 100. The one or more networks 110 may include one or more internal networks and/or one or more external networks. The one or more networks 110 may include any number of different types of networks enabling communication between the various computing devices, servers, and other components of the computing infrastructure 100, such as, for example, computer networks, telecommunications networks, wireless networks, and/or any combination of these and/or other networks.

In some embodiments, the integration infrastructure 101 may include a server system 130, which may be on premises and/or remote from the client computing devices 102. The server system 130 may include one or more servers 112. The one or more servers 112 may be communicatively coupled with the remote client computing devices 102 via the one or more networks 110. In various embodiments, the one or more servers 112 may be adapted to run one or more services or software applications provided by one or more of the components of the integration infrastructure 101.

Software components may be implemented on one or more of the servers 112, the server system 130, the cloud infrastructure system 130-1, and/or the client computing devices 102. Users operating the client computing devices 102 may utilize one or more client applications to use the services provided by components of the integration infrastructure 101. Various components of the computing infrastructure 100 may be implemented in hardware, firmware, software, or combinations thereof. It should be appreciated that various different system configurations are possible, which may be different from the example of the computing infrastructure 100. The embodiment shown in the figure is thus one example of a computing infrastructure 100 for implementing embodiments according to the present disclosure and is not intended to be limiting.

The client computing devices 102 may be portable handheld devices (e.g., a smartphone, a touchscreen tablet computer, a personal digital assistant or wearable devices), running software such as a variety of mobile operating systems such as iOS, Android, and the like, and being Internet, e-mail, short message service (SMS), or other communication protocol enabled. Alternatively, or in addition, the client computing devices 102 may be general-purpose personal computers including, by way of example, personal computers and/or laptop computers running various operating systems. Alternatively, or in addition, the client computing devices 102 may be workstation computers running any of a variety of operating systems. Alternatively, or in addition, the client computing devices 102 may be any other electronic device, such as a thin-client computer, and/or a personal messaging device, capable of communicating over the network(s) 110. Although a number of the client computing devices 102 is illustrated, any number of client computing devices 102 may be supported.

The network(s) 110 may be any type of network or combination of types of networks familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 may be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infrared network, a wireless network (e.g., a network operating under any of the Institute of Electrical and Electronics (IEEE) 802.11 suite of protocols, Bluetooth®, and/or any other wireless protocol); and/or any combination of these and/or other networks. Various components of the computing infrastructure 100 may include various network interfaces to facilitate communications between the client computing devices 102, one or more server systems 130, one or more remote systems 140, and/or a cloud infrastructure system 130-1. In some embodiments, some of the interfaces may include or otherwise correspond to API interfaces to transmit to and/or receive communications from one or a combination of the components of the computing infrastructure 100 using APIs.

Each server 112 may be composed of one or more general-purpose computers, one or more specialized server computers (including, by way of example, PC (personal computer) servers, UNIX® servers, mid-range servers, mainframe computers, rack-mounted servers, etc.), one or more server farms, one or more server clusters, or any other appropriate arrangement and/or combination. The servers 112 may include one or more system coordination servers that may include any suitable type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. System coordination servers may operate according to stored instructions located in a memory subsystem of the servers, and may run an operating system, including any suitable server operating system and/or any other operating systems discussed herein.

In various embodiments, one or more servers 112 may be adapted to run one or more services or software applications described in the present disclosure. For example, one or more servers 112 may execute one or more methods disclosed herein and/or facilitate features disclosed herein. Each server 112 may run an operating system, including any available server operating system. Each server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. In various embodiments, the servers 112 may include aggregation servers that share data with data storage servers via the one or more networks 110, which may include one or more internal networks. The data storage servers may be configured to store data and may include database servers, file storage servers, and other similar data storage servers. In various embodiments, the servers 112 may include interface servers that may provide one or more interfaces applications to interact with the other elements of the system 100. The interface servers may provide the one or more interfaces and communicate with the other elements of the system 100 via the one or more networks 110. The interfaces generated by the interface servers may be used by the client computing devices 102 to interact with elements of the system 100.

In some embodiments, one or more of the servers 112 may include one or more applications to analyze and consolidate resource data feeds and/or event resource updates received from one or more components of the system 100. In some examples, resource data feeds and/or resource event updates may include, but are not limited to, real-time resource data updates received from one or more third-party information sources and continuous data streams. In some examples, resource data feeds and/or resource event updates may include real-time resource events related to resource availability (e.g., a resource becoming available or unavailable); resource transfers initiated, in process, or completed; updates to data storage, records, or systems of record relating to resources; and/or the like. One or more of the servers 112 may also include one or more applications to display the resource data feeds, resource real-time events, resource availability data, resource transfer data, resource record data; resource data visualizations, and/or the like, via one or more display devices of the client computing devices 102.

The integration infrastructure 101 may include one or more data storage servers, which may include file-based storage systems, block storage systems, and/or cloud object storage systems. Data storages may comprise stored data germane to the functions of the integration infrastructure 101. Illustrative examples of data storages that may be maintained in certain embodiments are described below. In some embodiments, multiple data storages may reside on a single server 112, either using the same storage components of server 112 or using different physical storage components to assure data security and integrity between data storages. In other embodiments, each data storage may have a separate dedicated data storage server 112.

The integration infrastructure 101 may also include one or more databases 114. The databases 114 may reside in a variety of locations. By way of example, one or more of the databases 114 may reside on a non-transitory, storage medium local to (and/or resident in) one or more servers 112. Additionally or alternatively, one or more databases 114 may be remote from the servers 112 and in communication with the servers 112 via network-based or dedicated connection. In various embodiments, one or more databases 114 may reside in a storage-area network (SAN), NAS (Network Attached Storage), or cloud storage capabilities, such as block, file, or object storage. Similarly, any necessary files for performing the functions attributed to the servers 112 may be stored locally on the servers 112 and/or remotely, as appropriate. In one set of embodiments, the databases 114 may include relational databases that are adapted to store, update, and retrieve data in response to SQL-formatted commands.

The integration infrastructure 101 may include a cloud infrastructure system 130-1 that may be configured to provide infrastructure resources 132 and cloud services 134 made available to the client computing devices 102 via the one or more networks 110, which may include the Internet. The cloud infrastructure system 130-1 may include a server system, such as the server system 130. Although illustrated separately, in some embodiments, the cloud infrastructure 130-1 may include the server system 130 and provide cloud services to the client computing devices 102. In some embodiments, the cloud infrastructure 130-1 may include a version of the server system 130 and provide cloud services to the client computing devices 102, while the client computing devices 102 may additionally use the resources of the server system 130 such that the server system 130 may be on premises or remote with respect to the client computing device is 102. Accordingly, in various embodiments, resources may be provided to the client computing devices 102 by on-premises server system, remote server system, and/or cloud services. Thus, for example, in various embodiments, features disclosed herein to facilitate multi-system integration and cooperative multi-system operations in conformance with adaptive protocols may be provided by the one or both of the server system 130 and the cloud infrastructure 130-1.

The cloud infrastructure system 130-1 may include infrastructure resources 132 for providing the resources used to provide various services to clients. In various embodiments, the cloud services 134 provided by the cloud infrastructure system 130-1 may include a host of services that are made available to the client computing devices 102 on demand, such as online data storage and backup solutions, hosted office suites and document collaboration services, database processing, managed technical support services, and the like. The cloud services 134 may include infrastructure services that facilitate the management and control of the underlying computing resources, such as storage, networks, and other fundamental computing resources for clients. The cloud-provisioned resources may include resources shared by multiple users and dynamically re-allocated per demand, and pre-integrated and optimized combinations of hardware, such as servers, storage, and networking resources to execute services.

In various embodiments, the cloud services may include one or more services of various types such as Infrastructure as a Service (IaaS), Database as a Service (DbaaS), Platform as a Service (PaaS), Integration Platform as a Service (iPaaS), Software as a Service (SaaS), and/or other services including hybrid services. The underlying software and infrastructure for providing the clouds services may be managed and controlled by the cloud infrastructure system 130-1. In some examples, a cloud service may include protected computer network access to remote storage on the cloud through the Internet, a hosted database, a hosted web server, a software application, database cloud services, middleware cloud services, and Java cloud services, and/or the like. For example, a cloud service may include a web-based service, a web service-based hosted, a script-language middleware engine for use by a networked developer, and/or the like.

The computing infrastructure 100 may also include one or more remote service provider systems 140 (also referenced herein as remote systems and/or target systems) communicatively couplable to the integration infrastructure 101 via the one or more networks 110. Each remote system 140 may include one or more servers 112, one or more client computing devices 102, one or more databases, and/or the like. The integration infrastructure 101 may include hardware and software components to generate, store, and maintain the content resources for distribution to remote systems 140. The integration infrastructure 101 may include data storages of materials, various interface elements, page specifications, field specifications, corresponding metadata specifications, and/or the like disclosed herein to provide content specifications for remote systems 140 to facilitate configuration of user interfaces of client computing devices 102 of the remote systems 140.

Figure 2:
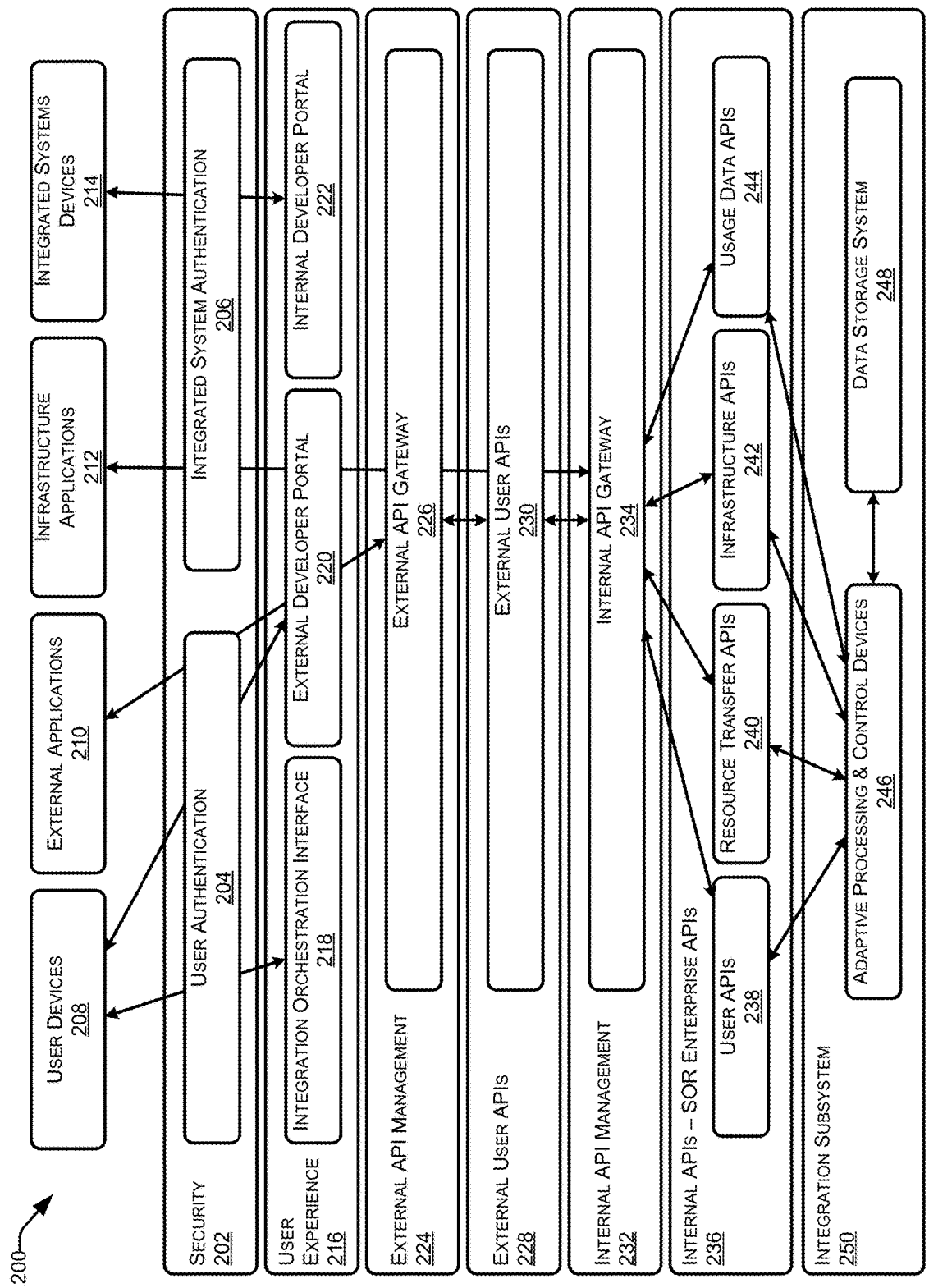
FIG. 2 illustrates an architecture stack of an integration infrastructure to facilitate multi-system integration and cooperative multi-system operations in conformance with adaptive protocols, in accordance with embodiments according to the present disclosure.

FIG. 2 illustrates an architecture stack 200 of the integration infrastructure 101 to facilitate multi-system integration and cooperative multi-system operations in conformance with adaptive protocols, in accordance with embodiments according to the present disclosure. In some embodiments, techniques relating to multi-system integration and cooperative multi-system operations in conformance with adaptive protocols may be implemented in accordance with the architecture stack 200. While architecture stack 200 is illustrated as having a particular structure, it is understood that other structures, including those with more or less layers than illustrated, are within the scope of this specification. In various embodiments, the architecture stack 200 may be implemented with the server system 130 and/or the cloud infrastructure system 130-1. The architecture stack 200 may be used to integrate different remote systems 140 of different entities and to provide data and sets of one or more functionalities of the integration infrastructure 101 that are particularized to the different remote systems 140.

The architecture stack 200 may include a security layer 202 that may correspond to an identity layer. The security layer 202 may be configured to perform identity management, authentication, and access control and may include elements to control access to other layers. The security layer 202 may, for example, include an identity management module configured to provide identity services, such as access management and authorization services. The identity management module may control information about remote systems 140 and associated users that utilize the services provided by the integration infrastructure 101. Such information can include information that authenticates the identities of such clients and information that describes which actions those clients are authorized to perform relative to various system resources (e.g., functions, files, directories, applications, communication ports, memory segments, etc.). The security layer 202 may, for example, look up entitlements to ensure that a particular user has the authority to be able to view or act on a particular account. The security layer 202 may include elements to verify user login credentials, IP addresses associated with a user device, and/or the like prior to granting access. The security layer 202 may provide for user authentication 204 and integrated system authentication 206 for different types of users. The different types of users may include user devices 208 that do not correspond to remote systems 140 that are partially integrated with the integration infrastructure 101. The different types of users may include external applications 210, infrastructure applications 212, integrated systems devices 214, and/or the like that correspond to remote systems 140 that are partially integrated with the integration infrastructure 101. Such users may be applications, systems, and devices corresponding to the servers 112 and client computing devices 102 of one or more remote systems 140.

The architecture stack 200 may include a user experience layer 216 that may correspond to an interface layer. The user experience layer 216 may provide interfaces for users to interact with the other elements of architecture stack 200. The user experience layer 216 may, for example, include an integration orchestration interface 218, an external developer portal 220, an internal developer portal 222, and/or the like. The external developer portal 220 may allow for external developers of a target system, for example, to test sets of one or more functionalities of the integration infrastructure 101 in connection with the target system device 208 and/or applications 210 in a sandbox environment prior to partial integration of the target system. The internal developer portal 222 may allow for external developers of a remote system 140, for example, to test sets of one or more functionalities of the integration infrastructure 101 in connection with the target system device 208 and/or applications 210 in a sandbox environment after partial integration of the remote system 140.

The integration infrastructure 101 may provide a portal, which may correspond to a cloud portal, support cloud portal, and/or the like, and which may include and/or otherwise facilitate an integration orchestration interface 218. The integration infrastructure 101 may provide one or more applications to facilitate the integration orchestration interface via the client device interfaces to expose integration testing, simulation, and control features to one or more of the remote systems 140. In some embodiments, the client device interfaces may include the integration orchestration interfaces. The integration orchestration interface 218 may provide for a remote integration interface that allows for management of integrations remotely, including communication with remote systems 140 to control, monitor, and change integrations while enforcing constraints and limitations particular to the type of integration selected by a user of a remote system 140. For example, the integration orchestration interface may facilitate user interfaces to view and confirm selected and system-recommended integration plans for the type of integration selected by a user of a remote system 140; to view the system-recommended integration plan, one or more system-recommended integration methods, and integration analyses; to surface parameter fields of adjustable parameters that affect the integration plan; to review the final integration plan before integration begins; to expose summary screens about the current configured systems and different statuses of the integrations (e.g., successfully completed integrations, finalized integration plans, etc.); to override, change, run, and otherwise control integration processes; and/or the like.

The integration orchestration interface 218, and the integration infrastructure 101 generally, may be multi-user capable and may provide graphical user interfaces to facilitate interaction with the integration infrastructure 101 by many users in parallel. In some embodiments, the user interface may be provided via a browser window and may correspond to a remote interface that that facilitates remote initiation and monitoring of an integration, without physical presence at a client site being necessary. In various embodiments, the integration infrastructure 101 may include, provide, and/or be configured for operation with the integration orchestration interfaces 218, for example, by making available and/or communicating with one or more of a website, a web page, a web portal, a web application, a mobile application, enterprise software, and/or any suitable application software to facilitate the integration orchestration interface 218. In some embodiments, the integration orchestration interface 218 may cause a web page to be displayed on a browser of a user device. The web page(s) may display output and receive input from a user (e.g., by using Web-based forms, via hyperlinks, electronic buttons, etc.). The integration infrastructure 101 may provide web applications to a user device for execution in a web browser running on the user device; and the web applications may include scripts, such as Java, JavaScript, etc., for execution within an isolated environment in a browser. A variety of techniques can be used to create the web pages and/or display/receive information, such as JavaScript, Java applications or applets, dynamic HTML and/or AJAX technologies. In some embodiments, the integration infrastructure 101 may provide rich-client applications to a user device; and the rich-client applications may be programmed in traditional programming languages to have full access to functions of the operating system running on the user device. In some embodiments, the integration interface 218 may include or work with a mobile application. In some embodiments, the integration infrastructure 101 may host an application, and a user of an integrated remote system 140 may, via a communication network such as the Internet, order on demand and use the application. In certain embodiments, the integration infrastructure 101 may include a suite of applications, middleware, and database service offerings that are delivered to a remote system 140 in a self-service, elastically scalable, reliable, highly available, and secure manner.

The integration orchestration interface 218 may include an API catalog interface in some embodiments. The API catalog interface may be configured to expose with selectable interface options for various APIs 230 that facilitate sets of one or more functionalities of the integration infrastructure 101 that may be selected by a user of a remote system 140 in order to integrate the remote system 140 with the integration infrastructure 101 so that the integration may allow for the use of the selected one or more sets of one or more functionalities of the integration infrastructure 101 by the integrated remote system 140. In various embodiments, one or more of the APIs 230 and/or the corresponding sets of one or more functionalities may be selected via the selectable interface options. Upon integration, the remote system 140 may utilize the selected one or more sets of one or more functionalities in any number of applications used by the remote system 140 as if the selected one or more sets of one or more functionalities were natively provided by the remote system 140. Accordingly, the integration may allow for the use of the selected one or more sets of one or more functionalities without the remote system 140 having to log in to the integration infrastructure 101 and provide various credentials, obtained authentication, download code, and/or the like.

Sets of one or more functionalities provided by the integration infrastructure 101 may correspond to a host of services that are made available to integrated remote systems 140, such as the secure transfer services disclosed herein. One or more sets of one or more functionalities may be related to secure transfers, for example. The integration infrastructure 101 may be configured to provide secure transfers to the other components of the network 100, such as remote systems 140. Secure transfers may include transfers of one or a combination of various, different types of data items, credentials, codes, authorizations, access rights, services, requests, files, database records, content, and/or the like corresponding to resources. In some embodiments, the integration infrastructure 101 may be configured to operate as a resource transfer and/or access system by which users at integrated remote systems 140 may initiate resource transfers (e.g., transfers of values of one or more media of exchange, access rights thereto, and/or allocations thereof to one or more user identifiers, codes, accounts, and/or like) and/or grant access to resources (e.g., values of one or more media of exchange, access rights thereto, and/or allocations thereof to one or more user identifiers, codes, accounts, and/or like) to and/or from the integration infrastructure 101 and/or one or more remote systems 140 and/or client devices 102 that may be in different locations, on different networks, and/or in different datacenters, etc.

In some embodiments, the integration orchestration interface 218 may include the external developer portal 220. In some embodiments, the external developer portal 220 may be separate from the integration orchestration interface 218. The external developer portal 220 may, in some embodiments, be configured to include features of the integration orchestration interface 218 but may further include a sandbox environment in which users from non-integrated remote systems 140 may perform, prior to integration, testing and simulation of one or more selected APIs, connections of the remote system 140 using the one or more selected APIs, and/or selected sets of one or more functionalities of the integration infrastructure 101. In some embodiments, the integration orchestration interface 218 may include the internal developer portal 222. In some embodiments, the internal developer portal 222 may be separate from the integration orchestration interface 218. The internal developer portal 222 may, in some embodiments, be configured to include features of the integration orchestration interface 218 but may further include a sandbox environment in which users from integrated remote systems 140 may perform, after integration, testing and simulation of one or more selected APIs, connections of the remote system 140 using the one or more selected APIs, and/or selected sets of one or more functionalities of the integration infrastructure 101. As contrasted with the external developer portal 220, the internal developer portal 222 may allow for further testing, simulation, and development of applications using one or more selected functionalities of the integration infrastructure 101, of customizations of the APIs, of customizations of the sets of one or more functionalities according to the particular rules specified by developers of the integrated remote system 140, and/or the like. In various embodiments, the external developer portal 220 and/or the internal developer portal 222 may facilitate user interfaces to view and confirm selected and system-recommended integration plans for the target remote system 140; to view the system-recommended integration plan, one or more system-recommended integration methods, and integration analyses; to surface parameter fields of adjustable parameters that affect the integration plan; to review the final integration plan before integration begins; to expose summary screens about the current configured systems and different statuses of the integrations (e.g., successfully completed integrations, finalized integration plans, etc.); to override, change, run, and otherwise control integration processes; to view an emulation of the remote system 140 integrations; and/or the like.

The architecture stack 200 may include multiple gateway layers. The architecture stack 200 may include an external API management layer 224 that may correspond to an API gateway layer and include an external API gateway 226. The external API gateway 226 may be configured to operate as a front-facing interface to all of the external user APIs 230 provided at an external user APIs layer 228. The external API gateway 226 may allow the external-user-directed applications 210 of remote systems 140 to be partially integrated with the integration infrastructure 101 by way of the external user APIs 230 exposed, which may include custom APIs for each application 210 and/or remote system 140. The remote systems 140 (e.g., with applications 201) may call through the external API gateway 226 to utilize the external user APIs 230, which may then call through an internal API gateway 234 at an internal API management layer 232 to internal APIs at an internal APIs layer 236.

The architecture stack 200 may further include an integration subsystem 250 with adaptive processing and control devices 246 and a data storage system 248. In various embodiments, the integration subsystem 250 may be communicatively coupled with one or a combination of any of the other layers of the architecture stack 200. As disclosed further herein with respect to the following figures, the integration subsystem 250 may be configured to facilitate the integration and/or control features to the remote systems 140.

Figure 3:
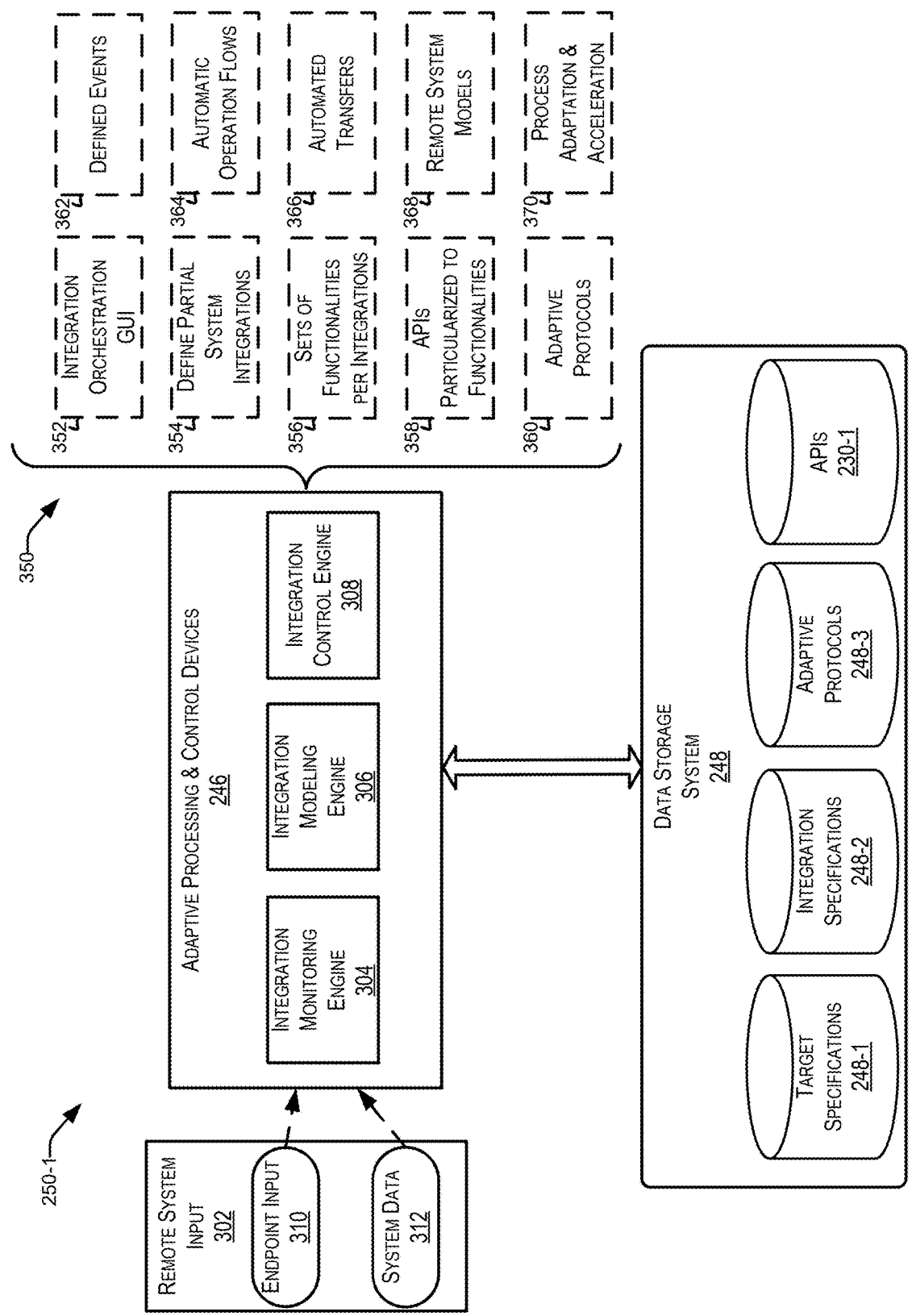
FIG. 3 illustrates a functional diagram of aspects of the integration subsystem, in accordance with embodiments of the present disclosure.

FIG. 3 shows a functional diagram of aspects of the integration subsystem 250-1, in accordance with embodiments of the present disclosure. The diagram may correspond to various portions of the integration infrastructure 101. In various embodiments, the integration subsystem 250-1 may include or otherwise be facilitated by one or a combination of the client computing devices 102, the server system 130, and/or the cloud infrastructure system 130-1. For example, the subsystem 200 may include a client computing device 102 using resources of the server system 130 and/or the cloud infrastructure system 130-1 to facilitate various features disclosed herein. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

The integration subsystem 250-1 may support cooperative multi-system operations of the integration infrastructure 101 and remote systems 140 and/or associated client computing devices 102-4. The integration subsystem 250-1 may be configured to provide a number of adaptive integration and/or control features 350. The integration subsystem 250-1 may include one or more adaptive processing and control devices 246. The adaptive processing and control devices 246 may include and be configured to provide one or more integration monitoring engines 304, one or more integration modeling engines 306, and/or one or more integration control engines 308, which may be separate or integrated in various embodiments. The engines 304, 306, and/or 308 may include logic to implement and/or otherwise facilitate the adaptive integration and/or control features 350 and the methods disclosed herein. In various embodiments, the monitoring engine 304 and/or modeling engines 306 may include one or more aggregation and/or transformation engines. While the engines are shown separately, it should be appreciated that in various embodiments the engines may be combined or broken down further according to various features provided in various embodiments. The engines may be stored in memory and may include executable code and/or one or more software applications specially configured to provide the features disclosed herein, executable with one or more processors of the client computing devices 102, the server system 130, and/or the cloud infrastructure system 130-1 to provide the features disclosed herein. In various embodiments, the one or more devices 246 may correspond to one or a combination of the client computing devices 102, the server system 130, and/or the cloud infrastructure system 130-1 with a single, integral engine or separate engines working in conjunction. The engines may be configured to perform any of the steps of methods (e.g., method 400) described in the present disclosure.

The one or more adaptive resource capacity processing and control devices 246 may be communicatively coupled with interface components and communication channels (which may take various forms in various embodiments as disclosed herein) configured to communicate with remote systems 140 and receive remote system input 302. The adaptive processing and control devices 246 (e.g., using the one or more integration monitoring engines 304) may receive remote system input 302 by way of one or a combination of API calls, push operations, pull operations, polling operations, listening to one or more communication buses, and/or the like. The one or more integration modeling engines 306 and/or the one or more integration control engines 308 may include logic to facilitate and/or implement the adaptive integration and/or control features 350. In various embodiments, the remote system data 312 from one or more remote system 140 may be retrieved and/or received by the subsystem 250-1 via one or more data acquisition interfaces, which may include interfaces of the one or more adaptive resource capacity processing and control devices 246 through one or more networks, through suitable means for direct communication, and/or through any other suitable means of transferring data. According to disclosed embodiments, the remote system data 312 may be pulled and/or pushed from the subsystem 250-1, for example, using automated collectors/agents (e.g., extraction, transformation, and loading (ETL)) in some embodiments. The remote system input 302 (e.g., remote system data 312) pulled and/or pushed from the remote systems 140 to facilitate use of the APIs of the integration infrastructure 101, the adaptive protocols, the functionalities of the integration infrastructure 101, and/or the partial integration of the remote systems 140 with the integration infrastructure 101.

The remote system input 302 may include target specifications of the remote system 140 that are pulled and/or pushed from the remote system 140. The target specifications collected may be stored by in the data storage 248 as stored target specifications 248-1. The target specifications of the remote system 140 may include any suitable specifications needed by the integration infrastructure 101 to interface effectively with the remote system 140 and coordinate communications in in view of the partial integration. The target specifications may correspond to certain information or components needed to be transmitted from the remote system 140 to the integration infrastructure 101 in order to establish the partial integration. The target specifications may, for example, include specifications of endpoint details (e.g., endpoint URLs for data transmissions and requests, corresponding request methods, request parameters, communications protocols, and/or the like) from the remote system 140 that are necessary for establishing and using a connection between the integration infrastructure 101 and the remote system 140. Additionally or alternatively, the target specifications may include authentication specifications of authentication information that needs to be generated by one system and shared with the other system to facilitate secure communications. The authentication specifications may, for example, specify one or more authentication methods/protocols, tokens, and/or credentials. Additionally or alternatively, the target specifications may include data specifications, such as specifications of data formats, data types, field mappings, data structures, schema definitions, and/or the like.

The remote system data 312 may be transformed and the transformed data and/or other data generated based thereon may be made available by the one or more adaptive processing devices 246. In some embodiments, the one or more data acquisition interfaces may include one or more APIs that define protocols and routines for interfacing with the remote systems 140. The APIs may specify API calls to/from data source components and/or systems. In some embodiments, the APIs may include a plug-in to integrate with one or more applications of the remote systems 140. The one or more data acquisition interfaces, in some embodiments, may use a number of API translation profiles configured to allow interface with the one or more additional applications of the remote systems 140. The API translation profiles may translate the protocols and routines of the data source component and/or system to integrate at least partially with the integration infrastructure 101 and allow two-way communication with the integration infrastructure 101 by way of API calls.

Figure 4A:
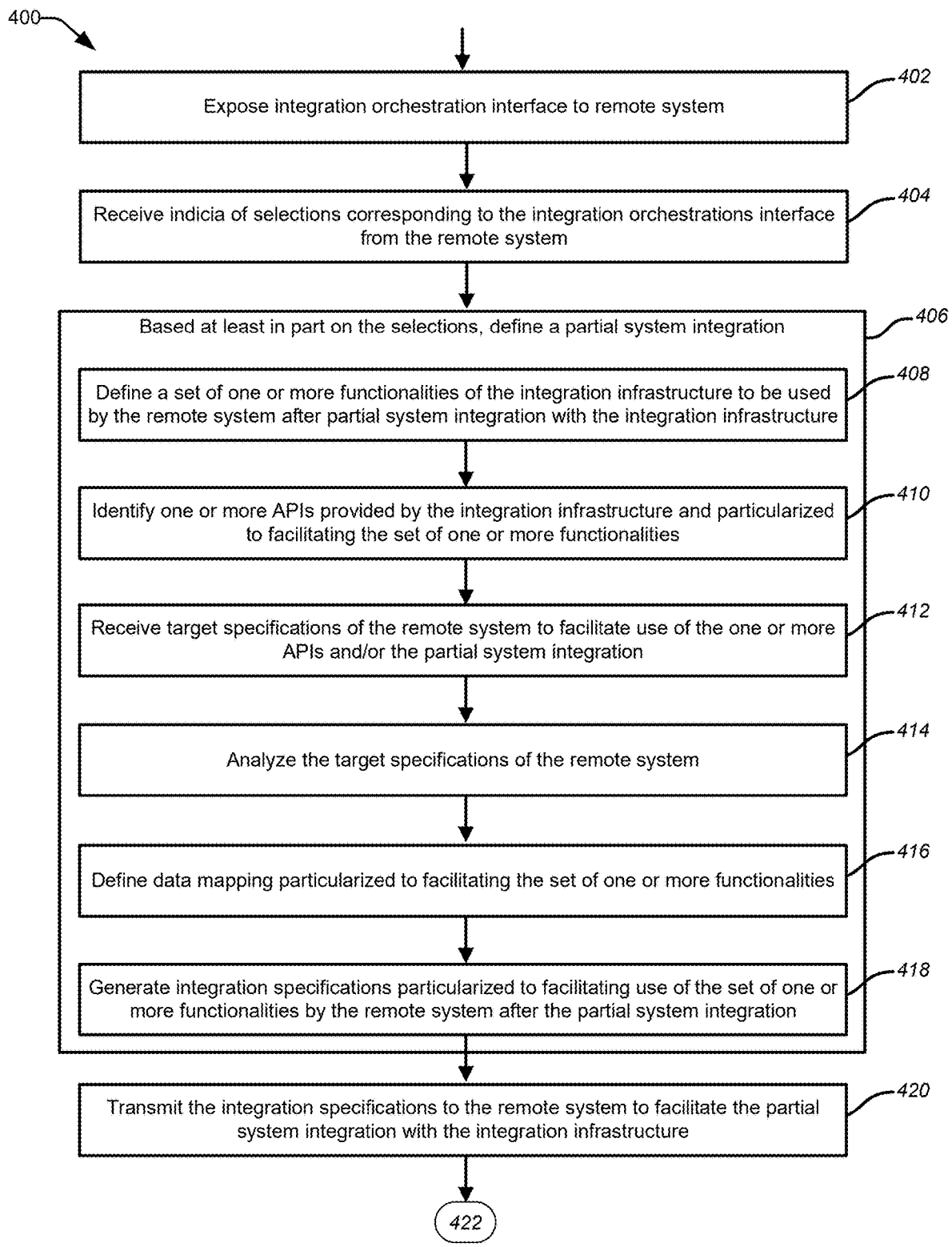
FIGS. 4A and 4B depict an example method to facilitate multi-system integration and cooperative multi-system operations in conformance with adaptive protocols, in accordance with embodiments according to the present disclosure.
Figure 4B:
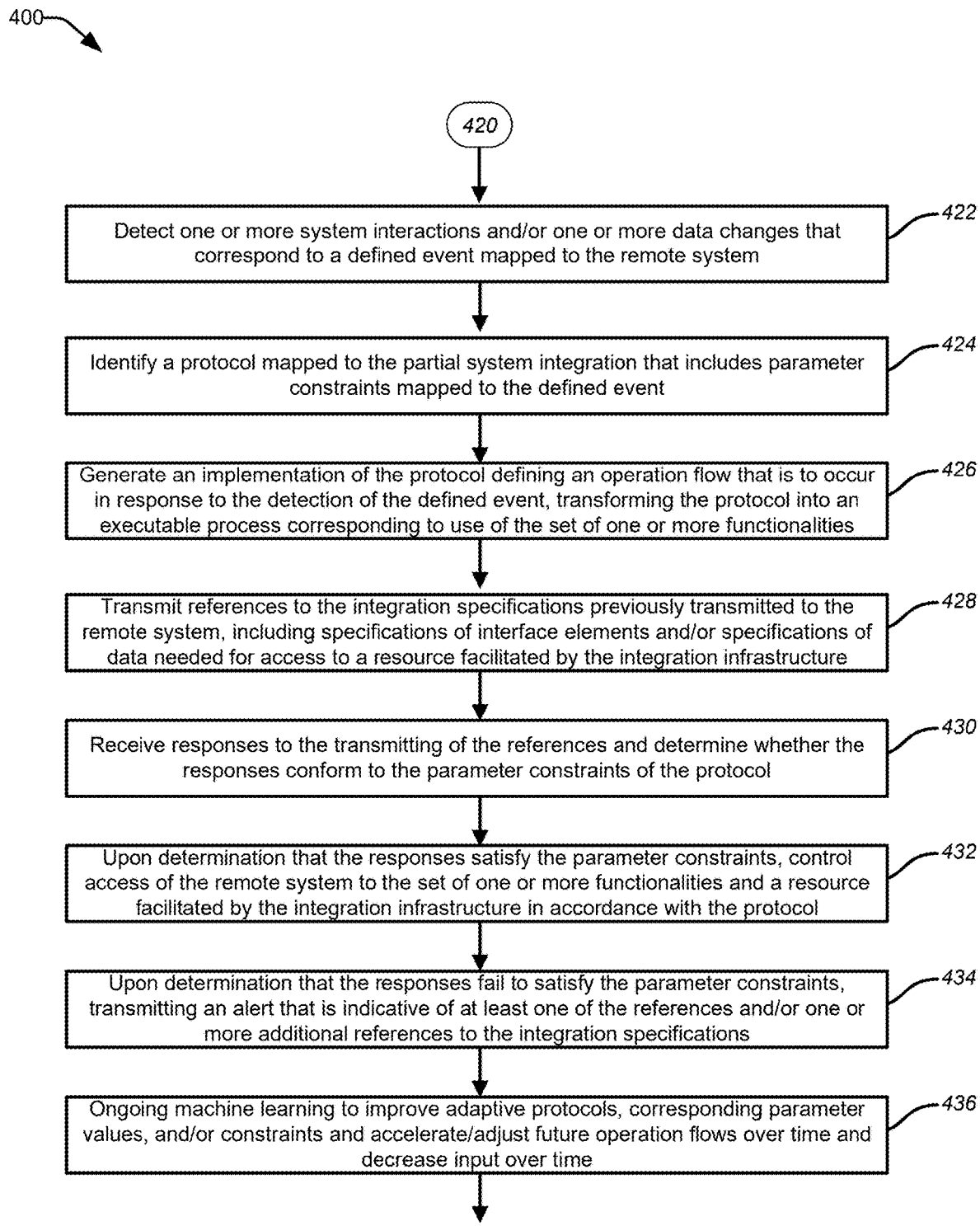

The adaptive integration and/or control features 350 may include facilitating an integration orchestration graphical user interface 352, which may correspond to the integration orchestration interface 218. By way of example of the adaptive integration and/or control features 350, FIGS. 4A and 4B depict an example method 400 to facilitate multi-system integration and cooperative multi-system operations in conformance with adaptive protocols, in accordance with embodiments according to the present disclosure. However, teachings of the present disclosure may be implemented in a variety of configurations. As such, the order of the steps comprising the method 400 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously. The integration subsystem 250-1 may be configured to perform operations corresponding to the method 400.

As indicated by block 402, the integration infrastructure 101 (e.g., with the integration subsystem 250-1 using the integration control engine 308) may expose the integration orchestration interface 218 to one or more remote systems 140. This may include providing content to facilitate a user interface that may be exposed to a plurality of remote systems 140. The integration orchestration interface 218 may include an API catalog interface with selectable interface options for various APIs 230 that facilitate sets of one or more functionalities of the integration infrastructure 101 that may be selected by a user of a remote system 140 in order to integrate the remote system 140 with the integration infrastructure 101 so that the integration may allow for the use of the selected one or more sets of one or more functionalities of the integration infrastructure 101 by the integrated remote system 140. Each remote system 140 may be located remotely from the infrastructure 101 and may be communicatively couplable with the integration infrastructure 101. Each remote system 140 may be configured to perform different types of operations according to operation requests from a plurality of endpoint devices, for example, client computing devices 102-4. For each remote system 140, the integration infrastructure 101 (e.g., with the subsystem 250-1) may perform one or a combination of the operations of the method 400, which may include facilitating direct integration with the remote systems 140, where the direct integration exposes a plurality of functionalities and data of the integration infrastructure 101. As indicated by block 404, indicia of one or more selections corresponding to the integration orchestration interface 218 may be received from one or more remote systems 140 (e.g., with the integration subsystem 250-1 using the integration monitoring engine 304). In various embodiments, one or more of the APIs 230 and/or the corresponding sets of one or more functionalities may be selected via the selectable interface options.

Referring again to FIG. 3, indications of the selections may be included in the remote system input 302 received the integration subsystem 250-1. The integration monitoring engine 304 may be configured to monitor the remote system input 302 for any suitable aspects to facilitate the integration features disclosed herein. The remote system input 302 may include input from a plurality of different data sources. As depicted, the remote system input 302 may include remote system endpoint data 310 and remote system data 312. The integration subsystem 250-1 may process and analyze system remote system endpoint data 310 and remote system data 312 to provide for other features disclosed herein, such as other adaptive integration and/or control features 350. The remote system endpoint data 310 may include input from one or more client computing devices 102-4, which could correspond to input from integrated remote system users accessing the integration infrastructure 101. The remote system endpoint data 310 may include the selections made with the integration orchestration interface 218. Such selections may correspond to one or more of the APIs 230 and/or the corresponding sets of one or more functionalities that may be selected via the selectable interface options of the integration orchestration interface 218, which may include an API catalog interface with selectable interface options for various APIs 230 that facilitate sets of one or more functionalities of the integration infrastructure 101 that may be selected by a user of a remote system 140 in order to integrate the remote system 140 with the integration infrastructure 101 so that the integration may allow for the use of the selected one or more sets of one or more functionalities of the integration infrastructure 101 by the integrated remote system 140.

The technical improvements provided by the integration infrastructure 101 over prior technologies include improvements in performance of parallel/simultaneous integrations of multiple remote systems 140 while providing customized APIs 230, adaptive protocols, and functionalities adapted to each remote system 140, and parallel integration control, at least in part by machine-intelligent handling of input from multiple different sources, including the remote systems 140 and the client computing devices 102-4, and generating implementations of the remote-system-specific, adaptive protocols as a function of particular remote systems 140 that transform the adaptive protocols into executable processes that apply to the particular remote systems 140. The APIs 230 may include APIs 230 customized for each application 210 and/or remote system 140 in various embodiments. The adaptive integration and/or control features 350 may include defining partial system integrations 354. Based at least in part on the remote system input 302, the integration subsystem 250-1 (e.g., using the integration modeling engine 306) may define the partial system integrations 354 for partially integrating remote systems 140. Integration specifications corresponding to the definitions of the partial system integrations may be stored in data storage of the subsystem 250-1 as stored integration specifications 248-2. The partial system integrations 354 may allow for the remote systems 140 to use functionalities of the integration infrastructure 101.

The partial system integrations 354 may further allow for the integration infrastructure 101 (e.g., using the integration control engine 308) to perform operations corresponding to the functionalities automatically on behalf of the remote systems 140. To that end, the adaptive integration and/or control features 350 may include providing for various sets of one or more functionalities 356 by the integration infrastructure 101 for use by the remote systems 140 after partial system integration with the integration infrastructure 101. To facilitate the partial system integration and the use of the various sets of one or more functionalities, the adaptive integration and/or control features 350 may include providing for one or more APIs 358 particularized to facilitating the sets of one or more functionalities. The use of such functionalities may be initiated by the remote systems 140 and/or users thereof. The use of such functionalities may also be initiated by the integration infrastructure 101 in accordance with the adaptive protocols. Accordingly, the adaptive integration and/or control features 350 may include providing for one or more adaptive protocols 360 particularized to the partial system integrations and the corresponding remote systems 140. The one or more adaptive protocols 360 may include one or more event definitions 362. Detections of one or more events corresponding to the one or more event definitions 362 may trigger one or more automatic operation flows 364 according to the one or more adaptive protocols 360. The one or more automatic operation flows 364 may effect one or more automated secure transfers 366 as disclosed herein. The adaptive protocols may be retained in the data storage 308 as adaptive protocol specifications 248-3. In various embodiments, the target specifications 248-1, the integration specifications 248-2, the adaptive protocols 248-3, and/or the APIs 230-1 there are particularized to a particular remote system 140 may be a part of a custom remote system model 368 developed by the integration modeling engine 306 as particularized to the remote system 140 to facilitate the various features and functionalities provided to the remote system 140. The integration modeling engine 306 may perform ongoing machine learning to improve the remote system model 368 and perform process adaptation and acceleration 370 to adapt and accelerate the automatic operations flows 364 and automated transfers 366 over time.

Referring to FIG. 4, as indicated by block 406, the integration infrastructure 101 may process the indicia of the one or more selections made with the integration orchestration interface 218 and, based at least in part on the one or more selections, may define a partial system integration (e.g., with the integration subsystem 250-1 using the integration modeling engine 306). As indicated by block 408, the defining the partial system integration may be based at least in part on defining a set of one or more functionalities of the integration infrastructure 101 to be used by the remote system 140 after the partial system integration of the remote system 140 with the integration infrastructure 101. The integration infrastructure 101 may provide a plurality of selectable and adaptable services that may be selected by a user of the remote system 140. Such services may include providing for the set of one or more functionalities. For example, the adaptable services may provide for various sets of one or more functionalities corresponding to various types of secure transfers from the integration infrastructure 101 to the other components of the network 100, such as other remote systems 140 and/or other client devices 102. Thus, set of one or more functionalities may facilitate automatic secure transfers. Secure transfers may include transfers of one or a combination of various, different types of data items, credentials, codes, authorizations, access rights, services, requests, files, database records, content, and/or the like corresponding to resources.

Various embodiments of the integration subsystem 250-1 and the infrastructure 101 may be implemented and configured to perform secure transfers between remote systems 140 and/or associated client computing devices 102-4, and/or the infrastructure 101, with the infrastructure 101 coordinating operations of the remote systems 140 and/or associated client computing devices 102-4 in conformance with adaptive protocols. With the integration infrastructure 101 configured to operate as a resource transfer and/or access system, the adaptable services may provide for various sets of one or more functionalities by which the integration infrastructure 101 may automatically (on behalf of users at integrated remote systems 140) resource transfers (e.g., transfers of values of one or more media of exchange, access rights thereto, and/or allocations thereof to one or more user identifiers, codes, accounts, and/or like) and/or grant access to resources (e.g., values of one or more media of exchange, access rights thereto, and/or allocations thereof to one or more user identifiers, codes, accounts, and/or like) to and/or from the integration infrastructure 101 and/or one or more remote systems 140 and/or client devices 102 that may be in different locations, on different networks, and/or in different datacenters, etc. in accordance with adaptive protocols. The integration infrastructure 101 may define the one or more adaptive protocols based at least in part on the set of one or more functionalities. The one or more adaptive protocols may provide for operational rules that include dependencies on one or a combination of: the type of transfer (e.g., an automatic payment, an automatic invoice, etc.), one or more values of the transfer, type of access, the location of the sender system/device/account, the location of the receiver system/device/account, information pulled and/or otherwise provided from the remote system 140 to facilitate the transfer, information related to the remote system 140 and the transfer and stored by the integration infrastructure 101 to facilitate the transfer, and/or the like. In various embodiments, one or more adaptive protocols may be defined and/or modified at one or more stages of the method 400. In some embodiments, the integration orchestration interface 218 may be used by one or more users of the remote system 140 to set up the partial system integration and one or more adaptive protocols particularized to the remote system 140 and to modify the one or more adaptive protocols particularized throughout the partial system integration. Accordingly, in some embodiments, one or more adaptive protocols may be defined and/or modified based at least in part on the one or more selections made with the integration orchestration interface 218 and/or additional selections and other input with the integration orchestration interface 218.

As indicated by block 410, the defining the partial system integration may be based at least in part on identifying one or more APIs 230 provided by the integration infrastructure 101 and particularized to facilitating the defined set of one or more functionalities. The one or more APIs 230 may, for example, be suitable for secure transfers and may include specifications of one or a combination of: authentication tokens API keys, and/or the like to authorize data transfer; request protocols for API calls and routines for interfacing between the remote system 140 and the integration infrastructure 101; system identifiers for the integration infrastructure 101; connection settings for connections to the integration infrastructure 101; interface configurations for ongoing interfacing with the integration infrastructure 101; data transformation rules for conversions of data when exchanging data with the integration infrastructure 101; and/or the like that may be suitable for secure transfers, for example. In some embodiments, the one or more APIs 230 may include a plug-in to integrate with one or more applications of the remote system 140. The one or more APIs 230, in some embodiments, may use a number of API translation profiles configured to allow interface with the one or more applications of the remote system 140 to access data (e.g., a database or other data store) of the remote system 140. The API translation profiles may translate the protocols and routines of one or more components of the remote system 140 to partially integrate with the integration infrastructure 101 and allow bidirectional communication with the integration infrastructure 101 by way of API calls.

As indicated by block 412, the integration infrastructure 101 may receive target specifications of the remote system 140 that are pulled and/or pushed from the remote system 140 to facilitate use of the APIs 230 of the integration infrastructure 101 and/or the partial integration of the remote systems 140 with the integration infrastructure 101. The target specifications of the remote system 140 may include any suitable specifications needed by the integration infrastructure 101 to interface effectively with the remote system 140 and coordinate communications in in view of the partial integration. The target specifications may correspond to certain information or components needed to be transmitted from the remote system 140 to the integration infrastructure 101 in order to establish the partial integration. The target specifications may, for example, include specifications of endpoint details (e.g., endpoint URLs for data transmissions and requests, corresponding request methods, request parameters, communications protocols, and/or the like) from the remote system 140 that are necessary for establishing and using a connection between the integration infrastructure 101 and the remote system 140. Additionally or alternatively, the target specifications may include authentication specifications of authentication information that needs to be generated by one system and shared with the other system to facilitate secure communications. The authentication specifications may, for example, specify one or more authentication methods/protocols, tokens, and/or credentials. Additionally or alternatively, the target specifications may include data specifications, such as specifications of data formats, data types, field mappings, data structures, schema definitions, and/or the like.

As indicated by block 414, the integration infrastructure 101 may analyze the target specifications of the remote system 140. As indicated by block 416, the defining the partial system integration may be based at least in part on defining a data mapping particularized to facilitating the set of one or more functionalities. The data mapping may specify data fields that need to be transferred and how the data fields map between the integration infrastructure 101 and the remote system 140. As indicated by block 418, the defining the partial system integration may be based at least in part on generating integration specifications particularized to preparing the remote system 140 to exchange data and interface with the integration infrastructure 101 and to facilitating use of the set of one or more functionalities by the remote system 140 after the partial integration of the remote system 140 with the integration infrastructure 101. The integration specifications may include or be in the form of one or more configuration files. The integration specifications may include configuration settings for setting up the partial system integration, establishing connections to the selected APIs 230 (e.g., endpoints, IP addresses, ports, and/or the like for the APIs), establishing permissions, and/or the like, which may include one or accommodation of the following aspects of the integration specifications according to various embodiments. The integration specifications may include the data mapping and rules as to how data may need to be transformed in order to ensure compatibility and usability of the data exchanged between the integration infrastructure 101 and the remote system 140. The rules, for example, may specify data transformation that may include changing data formats, currency conversions, and/or the like. The data mapping may include templates and/or field definitions (e.g., required fields, field names, field data types and formats, and/or the like) to specify how data from the remote system 140 needs to be structured and to configure the remote system 140 to provide the data needed pursuant to the partial system integration. The integration specifications may include authentication credentials and security protocols needed for secure data exchange between the remote system 140 and the integration infrastructure 101. The integration specifications may include one or more scripts, logic, and/or specifications of one or more workflows, one or more conditions, one or more triggers, and/or one or more operations for when and how data is exchanged between the remote system 140 and the integration infrastructure 101, which may include for the integration orchestration interface 218 that may be exposed to remote system users to facilitate the sets of one or more functionalities, operation flows, and/or secure transfers, and may include for pulling information from the remote system 140 to facilitate the transfer the sets of one or more functionalities, operation flows, and/or secure transfers.

As indicated by block 420, the integration infrastructure 101 (e.g., with the integration subsystem 250-1 using the integration control engine 308) may transmit to the remote system 140 the integration specifications particularized to facilitating the set of one or more functionalities to facilitate the partial system integration of the remote system 140 with the integration infrastructure 101. Accordingly, the integration infrastructure 101 may cause the partial system integration of the remote system 140 with the integration infrastructure 101. Upon partial system integration, the remote system 140 may utilize the selected one or more sets of one or more functionalities in any number of applications used by the remote system 140 as if the selected one or more sets of one or more functionalities were natively provided by the remote system 140. In various embodiments, the partial system integration may allow for the use of the selected one or more sets of one or more functionalities without the remote system 140 having to log in to the integration infrastructure 101 and provide various credentials, obtained authentication, download code, and/or the like.

As indicated by block 422, the integration infrastructure 101 (e.g., with the integration subsystem 250-1 using the integration monitoring engine 304) may detect one or more system interactions and/or one or more data changes that correspond to a defined event that is mapped to the remote system 140. As indicated by block 424, the integration infrastructure 101 may identify an adaptive protocol mapped to the partial system integration that includes parameter constraints mapped to the defined event. In various embodiments, the adaptive protocol may correspond to a protocol for an automated secure transfer. The defined events may be particularized to each remote system 140 that is partially integrated and may be stored with the adaptive protocols 248-3 that are adapted to the particular remote system 140. In various embodiments, the defined event may correspond to a defined time/date that may be repeated on a periodic basis (e.g., monthly, weekly, daily, hourly, etc.). In various embodiments, the defined event may correspond to a device interaction or data change caused with respect to at least one client computing device 102, at least one remote system 140, and/or the integration infrastructure 101 that may include, specify, indicate, define, and/or otherwise correspond to one or more factors affecting one or more resources controlled by the resource-controlling systems (e.g., the integration infrastructure 101, one or more remote systems 140); states of the resource-controlling systems; states, values, and metrics of resources controlled and/or otherwise used by the resource-controlling systems; and/or the like. In various embodiments, the defined event may correspond to one or more real-time resource events related to resource availability (e.g., a resource becoming available or unavailable); resource transfers initiated, in process, or completed; updates to data storage, records, or systems of record relating to resources; and/or the like.

In some embodiments, a defined event may correspond to a client computing device 102-4, for example, submitting a set of one or more access requests in a session to the integration infrastructure 101 as part of a particular session where one or more transfers are initiated. The integration infrastructure 101 may be configured, for example, to receive requests from a client computing device 102-4 and respond with webpage data or mobile app data. Various instances of the set of one or more access requests may include credentials, codes, and/or verification information that may be used to determine whether resource access is to be granted, but additional constraints may be required depending on the context and a variety of factors, including the type of transfer, one or more values of the transfer, type of access, the location of the sender system/device/account, the location of the receiver system/device/account, information pulled and/or otherwise provided from the remote system 140 to facilitate the transfer, information related to the remote system 140 and the transfer and stored by the integration infrastructure 101 to facilitate the transfer, and/or the like. The additional constraints may require additional data and data verification operations for particular access requests, transfers, and sessions. However, in various embodiments, the adaptive protocol may specify operational rules that trigger one or a combination of the following operations without requiring one or a combination of the aforementioned access requests, credentials, codes, and/or verification information, as one or a combination of such may be stored by the integration infrastructure 101 as part of the partial system integration. Accordingly, in various embodiments, one or a combination of the following operations may be automatically executed by the integration infrastructure 101 in response to the integration infrastructure 101 detecting a defined event.

As indicated by block 426, the integration infrastructure 101 (e.g., with the integration subsystem 250-1 using the integration modeling engine 306 and/or the integration control engine 308) may generate an implementation of the adaptive protocol. The implementation of the protocol may define an operation flow that is to occur in response to the detection of the defined event. The implementation of the protocol may transform the protocol into an executable process that applies to the remote system 140. For example, the implementation of the protocol may transform the protocol into an executable process corresponding to use of the set of one or more functionalities by the remote system 140 and/or by the integration infrastructure 101 on behalf of the remote system 140. The integration infrastructure 101 may perform the operation flow, which may include one or a combination of the following. In some embodiments, the operation flow may provide for an automated secure transfer. As indicated by block 428, the integration infrastructure 101 (e.g., with the integration subsystem 250-1 using the integration control engine 308) may transmit to the remote system 140 references to the integration specifications previously transmitted to the remote system 140 to pull data needed for the operation flow and/or secure transfer to proceed and/or to cause the integration orchestration interface 218 to elicit input needed for the operation flow and/or secure transfer to proceed. The integration specifications may include specifications of interface elements and/or specifications of data needed for access to a resource facilitated by the integration infrastructure 101 in accordance with the adaptive protocol. The references may include pointers to data elements specified by the integration specifications that the remote system 140 needs to provide for the set of one or more functionalities and the operation flow. In some embodiments, the transmitting the references may cause the remote system 140 to configure an interface in accordance with the specifications of interface elements so that a user can view and/or provide the input needed for the operation flow and/or secure transfer to proceed. In some embodiments, the transmitting the references may pull from the remote system 140 the data needed for the operation flow and/or secure transfer to proceed. The integration infrastructure 101 may transmit references to different integration specifications that are a function of the type of transfer, one or more values of the transfer, type of access, the location of the sender system/device, the location of the receiver system/device, and/or the like. Thus, the selection of references may be a function of whether the transfer is directed to a receiver systems, devices, and/or accounts in different countries where the rules and required information are different for every country.

As indicated by block 430, the integration infrastructure 101 (e.g., with the integration subsystem 250-1 using the integration monitoring engine 304 and/or the integration control engine 308) may receive from the remote system 140 responses to the transmitting of the references and may determine whether the responses conform to the parameter constraints of the adaptive protocol. As indicated by block 432, the integration infrastructure 101 (e.g., with the integration subsystem 250-1 using the integration modeling engine 306 and/or the integration control engine 308) may, upon a determination that the responses satisfy the parameter constraints, control access to the resource facilitated by the integration infrastructure 101 in accordance with the protocol. Alternatively, as indicated by block 434, the integration infrastructure 101 may, upon a determination that the responses fail to satisfy the parameter constraints, transmit an alert to the remote system 140 that is indicative of at least one of the references and/or one or more additional references to the integration specifications. Such validation may include determining whether the responses, whether they be user-provided and/or system-pulled according to various embodiments, conform to the parameters (e.g., types of data, data fields, formats of data, values of data, confirmations and acknowledgements, and/or the like) required for the particular dependencies corresponding to the set of one or more functionalities and/or the operation flow. Such dependencies may be specified by the adaptive protocol for one or a combination of: the type of transfer, one or more values of the transfer, type of access, the location of the sender system/device/account, the location of the receiver system/device/account, information pulled and/or otherwise provided from the remote system 140 to facilitate the transfer (e.g., additional information needed depending on the type and/or sufficiency of the information previously provided via user input and/or system pulling in the same session and/or a previous session; if one type of sender and/or receiver information is collected, then other particular sender and/or receiver information may also need to be collected for the transfer; missing data requests triggering additional data collection), information related to the remote system 140 and the transfer and stored by the integration infrastructure 101 to facilitate the transfer (e.g., additional information needed depending on the type and/or sufficiency of the information previously already stored), and/or the like.

As indicated by block 436, the integration infrastructure 101 (e.g., with the integration subsystem 250-1 using the integration monitoring engine 304) may perform ongoing machine learning to improve adaptive protocols, corresponding parameter values, constraints, and/or the like to accelerate and adjust future operation flows over time and decrease input over time from the remote system 140 needed for operation flows and/or secure transfers to proceed. Referring again to FIG. 3, the integration modeling engine 306 may include or be a learning engine. The integration modeling engine 306 may include logic to implement and/or otherwise facilitate any taxonomy, classification, categorization, correlation, mapping, data analytics, machine learning, pattern matching, qualification, scoring, organization, and/or the like to facilitate features disclosed herein. In various embodiments, the integration modeling engine 306 may employ one or more artificial intelligence (machine learning or, more specifically, deep learning) algorithms, employing an ongoing machine learning mode to confirm, correct, and/or refine determinations made for the operation flow that is to occur in respond to future detections of defined events. Input required from the remote system 104 may be decreased based at least in part on the learning of the integration modeling engine 306 so that the input required for future operation flows and/or secure transfers need only be a subset of the previously required set of input requirements. Such learning may include feedback loop features with feedback options provided with the integration orchestration interface 218 to facilitate the ongoing learning mode. User-selectable options provided with notifications (e.g., push notifications to the client computing devices 102, pop-up/modal windows with the interface 218, and/or the like) may be provided to allow administrative confirmation or correction of machine-learned determinations for automated operations flows for secure transfers and corresponding input needed. The feedback may be used for training and adapting the subsystem models. The integration monitoring engine 304 may generate updates or updated integration specifications based on the learning. Periodically or on another basis, the integration control engine 308 may send updated integration specifications to the remote system 140 to implement the improvements and accelerate future secure transfers so that decreased input from the remote system is needed for the automated operation flows and transfers.

Figure 5:
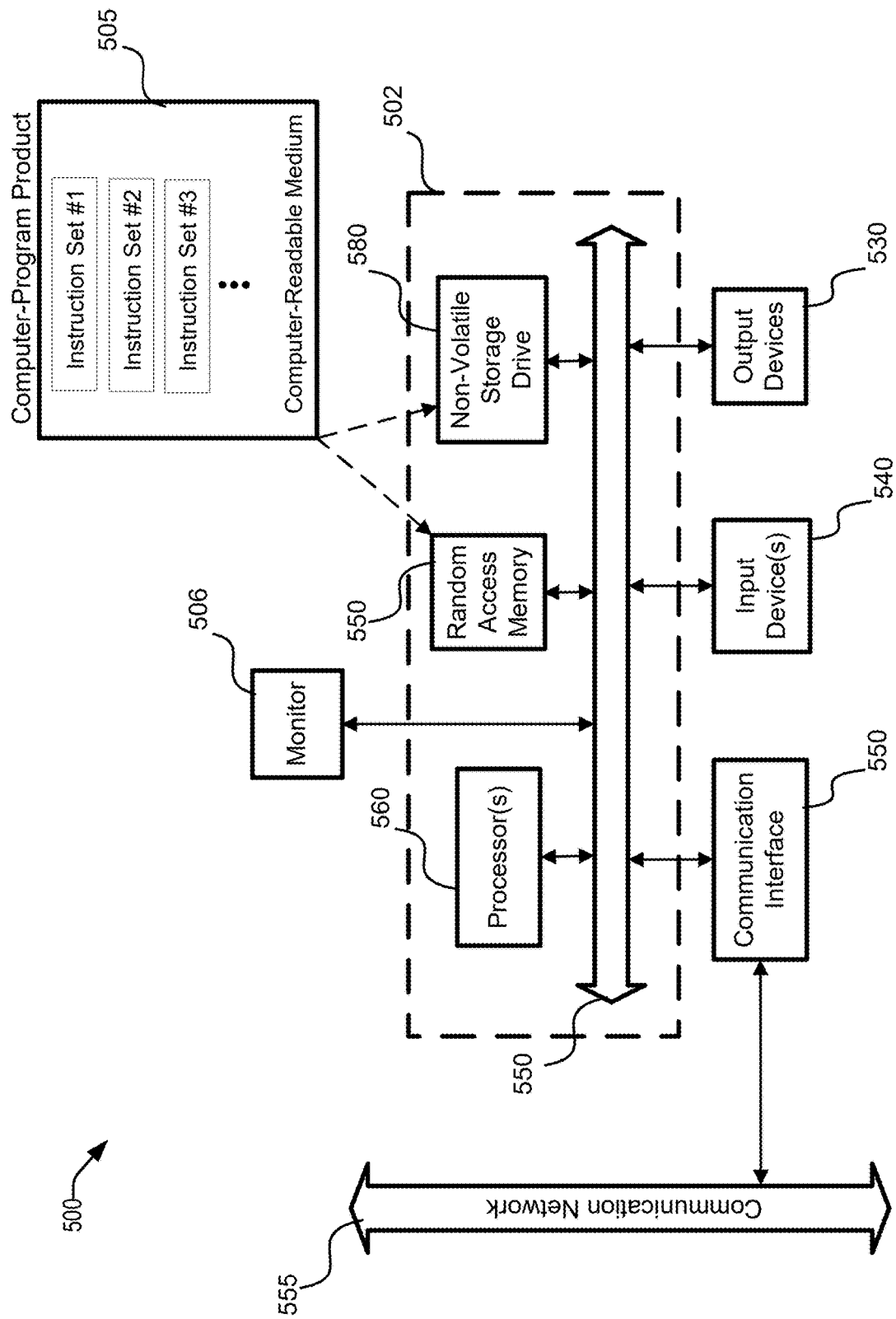
FIG. 5 illustrates a special-purpose computer system, in accordance with disclosed embodiments according to the present disclosure.

With reference to FIG. 5, an embodiment of a special-purpose computer system 500 is shown. The above methods may be implemented by computer-program products that direct a computer system to perform the actions of the above-described methods and operations. In various embodiments, the special-purpose computer system 500 may implement, at least in part, the subsystem 250-1. In various embodiments, the computer system 500 may correspond at least in part to one or more of the adaptive processing and control devices 246, the client computing devices 102, the server system 130, the cloud infrastructure system 130-1, and/or the remote system 140. Each such computer-program may comprise sets of instructions (codes) embodied on a computer-readable medium that directs the processor of a computer system to perform corresponding actions. The instructions may be configured to run in sequential order, or in parallel (such as under different processing threads), or in a combination thereof. Merely by way of example, one or more procedures described with respect to the method(s) discussed herein might be implemented as code and/or instructions executable by a computer (and/or a processor within a computer); in an aspect, then, such code and/or instructions can be used to configure and/or adapt a general purpose computer (or other device) to perform one or more operations in accordance with the described methods, transforming the computer into the special-purpose computer system 500.

As discussed further herein, according to a set of embodiments, some or all the procedures of such methods are performed by the computer system 500 in response to processor-execution of one or more sequences of one or more instructions (which might be incorporated into the operating system and/or other code, such as an application program) contained in the operating memory. Such instructions may be read into the operating memory from another computer-readable medium, such as one or more of the non-transitory storage device(s). Merely by way of example, execution of the sequences of instructions contained in the operating memory might cause the processor(s) to perform one or more procedures of the methods described herein.

Special-purpose computer system 500 may include a computer 502, a monitor 506 coupled to computer 502, one or more additional user output devices 530 (optional) coupled to computer 502, one or more user input devices 540 (e.g., joystick, keyboard, mouse, track ball, touch screen buttons, switches, control handles, and/or the like) coupled to computer 502, a communications interface 550 coupled to computer 502, a computer-program 505 stored in a tangible computer-readable memory in computer 502. Computer program 505 directs system 500 to perform the above-described methods. Computer 502 may include one or more processors 560 that communicate with a number of peripheral devices via a bus subsystem 590. These peripheral devices may include user output device(s) 530, user input device(s) 540, communications interface 550, and a storage subsystem, such as random-access memory (RAM) 570 and non-volatile storage drive 580 (e.g., disk drive, optical drive, solid state drive), which are forms of tangible computer-readable memory.

Computer program 505 may be stored in non-volatile storage drive 580 or another computer-readable medium accessible to computer 502 and loaded into memory 570. Each processor 560 may comprise a microprocessor, such as a microprocessor from Intel® or Advanced Micro Devices, Inc.®, or the like. To support computer-program 505, the computer 502 runs an operating system that handles the communications of 505 with the above-disclosed components, as well as the communications between the above-disclosed components in support of the computer-program 505. Exemplary operating systems include Windows® or the like from Microsoft® Corporation, Solaris® from Oracle®, LINUX, UNIX, and the like. The processors 560 may include one or more special-purpose processors such as digital signal processing chips, graphics acceleration processors, video decoders, image processors, and/or the like.

User input devices 540 include all possible types of devices and mechanisms to input information to computer system 502. These may include a keyboard, a keypad, a mouse, a scanner, buttons, control handles, switches, a digital drawing pad, a touch screen incorporated into the display, audio input devices such as voice recognition systems, microphones, and other types of input devices. In various embodiments, user input devices 540 may be embodied as a computer mouse, a trackball, a track pad, a joystick, buttons, control handles, switches, wireless remote, a drawing tablet, a voice command system. User input devices 540 typically allow a user to select objects, icons, text and the like that appear on the monitor 506 via a command such as a click of a button or the like. User output devices 530 include all possible types of devices and mechanisms to output information from computer 502. These may include a display (e.g., monitor 506), printers, non-visual displays such as audio output devices, etc. Some embodiments may not have a separate monitor 506, but may have the monitors integrated with input devices and/or output devices, such as mobile devices, touchscreen devices, etc.

Communications interface 550 provides an interface to other communication networks 555 and devices and may serve as an interface to receive data from and transmit data to other systems, WANs and/or the Internet. Embodiments of communications interface 550 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 550 may be coupled to a computer network, to a FireWire® bus, or the like. In other embodiments, communications interface 550 may be physically integrated on the motherboard of computer 502, and/or may be a software program, or the like. In further examples, the communications interface 550 may be part of a communications subsystem, which can include without limitation a modem, a network card (wireless or wired), an infrared communication device, a wireless communication device, and/or a chipset (such as a Bluetooth™ device, BLE, an 802.11 device, an 802.15.4 device, a Wi-Fi device, a WiMAX device, cellular communication device, etc.), and/or the like. The communications subsystem may permit data to be exchanged with a network (such as the network described below, to name one example), other computer systems, and/or any other devices described herein.

RAM 570 and non-volatile storage drive 580 are examples of tangible computer-readable media configured to store data such as computer-program embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 570 and non-volatile storage drive 580 may be configured to store the basic programming and data constructs that provide the functionality of various embodiments of the present invention, as described above. The above are examples of one or more non-transitory storage devices that may be utilized by the system 500. Such storage devices may be configured to implement any appropriate data stores, including without limitation, various file systems, database structures, and/or the like.

Software instruction sets that provide the functionality of the present invention may be stored in RAM 570 and non-volatile storage drive 580. These instruction sets or code may be executed by the processor(s) 560. RAM 570 and non-volatile storage drive 580 may also provide a repository to store data and data structures used in accordance with the present invention. RAM 570 and non-volatile storage drive 580 may include a number of memories including a main random-access memory (RAM) to store of instructions and data during program execution and a read-only memory (ROM) in which fixed instructions are stored. RAM 570 and non-volatile storage drive 580 may include a file storage subsystem providing persistent (non-volatile) storage of program and/or data files. RAM 570 and non-volatile storage drive 580 may also include removable storage systems, such as removable flash memory. Bus subsystem 570 provides a mechanism to allow the various components and subsystems of computer 502 communicate with each other as intended. Although bus subsystem 570 is shown schematically as a single bus, alternative embodiments of the bus subsystem may utilize multiple busses or communication paths within the computer 502.

The above methods may be implemented by computer-program products that direct a computer system to control the actions of the above-described methods and components. Each such computer-program may comprise sets of instructions (codes) embodied on a computer-readable medium that directs the processor of a computer system to cause corresponding actions. The instructions may be configured to run in sequential order, or in parallel (such as under different processing threads), or in a combination thereof. Special-purpose computer systems disclosed herein include a computer-program product(s) stored in tangible computer-readable memory that directs the systems to perform the above-described methods. The systems include one or more processors that communicate with a number of peripheral devices via a bus subsystem. These peripheral devices may include user output device(s), user input device(s), communications interface(s), and a storage subsystem, such as random-access memory (RAM) and non-volatile storage drive (e.g., disk drive, optical drive, solid state drive), which are forms of tangible computer-readable memory.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The terms "computer-readable medium," "computer-readable media," "processor-readable medium," "processor-readable media," "machine-readable medium," and "machine-readable media," include, but are not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system to facilitate multi-system integration and cooperative multi-system operations in conformance with adaptive protocols, the system comprising:
    one or more processing devices and memory communicatively coupled with and readable by the one or more processing devices, the memory comprising processor-readable instructions which, when executed by the one or more processing devices, cause the system to perform operations comprising:
        providing content to facilitate a user interface that may be exposed to a plurality of remote systems communicatively couplable with the system, wherein each remote system of the plurality of remote systems is located remotely from the system and is configured to perform different types of operations according to operation requests from a plurality of endpoint devices, and wherein the system is configured to facilitate direct integration with remote systems that exposes a plurality of functionalities and data of the system;
        for at least one remote system of the plurality of remote systems:

receiving one or more selections corresponding to the user interface;

defining a partial system integration of the at least one remote system with the system based at least in part on the one or more selections, defining a set of one or more functionalities to be used by the at least one remote system after the partial system integration of the at least one remote system with the system, identifying one or more application programming interfaces (APIs) provided by the system and particularized to facilitating the set of one or more functionalities, and defining a data mapping particularized to facilitating the set of one or more functionalities;

generating integration specifications particularized to facilitating use of the set of one or more functionalities by the at least one remote system after the partial system integration of the at least one remote system with the system;

transmitting, to the at least one remote system, the integration specifications to facilitate the partial system integration of the at least one remote system with the system;

detecting one or more system interactions and/or one or more data changes that correspond to a defined event, the defined event mapped to the at least one remote system;

identifying a protocol mapped to the partial system integration that comprises parameter constraints mapped to the defined event;

generating an implementation of the protocol, the implementation of the protocol defining an operation flow that is to occur in response to the detection of the defined event, where the implementation of the protocol transforms the protocol into an executable process corresponding to use of the set of one or more functionalities by the at least one remote system;

performing the operation flow, the operation flow comprising:
  transmitting, to the at least one remote system, references to the integration specifications previously transmitted to the at least one remote system;
  receiving, from the at least one remote system, responses to the transmitting of the references;
  determining whether the responses conform to the parameter constraints of the protocol; and
  upon determination that the responses satisfy the parameter constraints, controlling access to a resource facilitated by the system in accordance with the protocol.

2. The system to facilitate multi-system integration and cooperative multi-system operations in conformance with adaptive protocols as recited in claim 1, the operations further comprising:
  receiving target specifications of the at least one remote system to facilitate use of the one or more APIs and/or the partial system integration.

3. The system to facilitate multi-system integration and cooperative multi-system operations in conformance with adaptive protocols as recited in claim 2, the operations further comprising:
  analyzing the target specifications of the at least one remote system;
  wherein the data mapping specifies data fields that need to be transferred and how the data fields map between the system and the at least one remote system.

4. The system to facilitate multi-system integration and cooperative multi-system operations in conformance with adaptive protocols as recited in claim 3, wherein the integration specifications comprise specifications of interface elements and/or specifications of data needed for access to the resource facilitated by the system in accordance with the protocol.

5. The system to facilitate multi-system integration and cooperative multi-system operations in conformance with adaptive protocols as recited in claim 4, wherein the partial system integration comprises a functional integration of the at least one remote system with the system.

6. The system to facilitate multi-system integration and cooperative multi-system operations in conformance with adaptive protocols as recited in claim 5, wherein the transmitting the references causes the at least one remote system to configure an interface in accordance with the specifications of interface elements.

7. The system to facilitate multi-system integration and cooperative multi-system operations in conformance with adaptive protocols as recited in claim 5, wherein the transmitting the references causes the at least one remote system to transmit the responses in accordance with the specifications of interface elements.

8. A method to facilitate multi-system integration and cooperative multi-system operations in conformance with adaptive protocols, the method comprising:
  providing, by an integration infrastructure, content to facilitate a user interface that may be exposed to a plurality of remote systems communicatively couplable with the integration infrastructure, wherein each remote system of the plurality of remote systems is located remotely from the integration infrastructure and is configured to perform different types of operations according to operation requests from a plurality of endpoint devices, and wherein the integration infrastructure is configured to facilitate direct integration with remote systems that exposes a plurality of functionalities and data of the integration infrastructure;
  for at least one remote system of the plurality of remote systems:
    receiving, by the integration infrastructure, one or more selections corresponding to the user interface;
    defining, by the integration infrastructure, a partial system integration of the at least one remote system with the integration infrastructure based at least in part on the one or more selections, defining a set of one or more functionalities to be used by the at least one remote system after the partial system integration of the at least one remote system with a system, identifying one or more application programming interfaces (APIs) provided by the system and particularized to facilitating the set of one or more functionalities, and defining a data mapping particularized to facilitating the set of one or more functionalities;
    generating integration specifications particularized to facilitating use of the set of one or more functionalities by the at least one remote system after the partial system integration of the at least one remote system with the integration infrastructure;
    transmitting, by the integration infrastructure to the at least one remote system, the integration specifications to facilitate the partial system integration of the at least one remote system with the integration infrastructure;

detecting one or more system interactions and/or one or more data changes that correspond to a defined event, the defined event mapped to the at least one remote system;

identifying a protocol mapped to the partial system integration that comprises parameter constraints mapped to the defined event;

generating an implementation of the protocol, the implementation of the protocol defining an operation flow that is to occur in response to the detection of the defined event, where the implementation of the protocol transforms the protocol into an executable process corresponding to use of the set of one or more functionalities by the at least one remote system;

performing the operation flow, the operation flow comprising:

transmitting, to the at least one remote system, references to the integration specifications previously transmitted to the at least one remote system;

receiving, from the at least one remote system, responses to the transmitting of the references;

determining whether the responses conform to the parameter constraints of the protocol; and upon determination that the responses satisfy the parameter constraints, controlling access to a resource facilitated by the integration infrastructure in accordance with the protocol.

9. The method to facilitate multi-system integration and cooperative multi-system operations in conformance with adaptive protocols as recited in claim 8, the method further comprising:

receiving, by the integration infrastructure, target specifications of the at least one remote system to facilitate use of the one or more APIs and/or the partial system integration.

10. The method to facilitate multi-system integration and cooperative multi-system operations in conformance with adaptive protocols as recited in claim 9, the method further comprising:

analyzing, by the integration infrastructure, the target specifications of the at least one remote system;

wherein the data mapping specifies data fields that need to be transferred and how the data fields map between the integration infrastructure and the at least one remote system.

11. The method to facilitate multi-system integration and cooperative multi-system operations in conformance with adaptive protocols as recited in claim 10, wherein the integration specifications comprise specifications of interface elements and/or specifications of data needed for access to the resource facilitated by the integration infrastructure in accordance with the protocol.

12. The method to facilitate multi-system integration and cooperative multi-system operations in conformance with adaptive protocols as recited in claim 11, wherein the partial system integration comprises a functional integration of the at least one remote system with the integration infrastructure.

13. The method to facilitate multi-system integration and cooperative multi-system operations in conformance with adaptive protocols as recited in claim 12, wherein the transmitting the references causes the at least one remote system to configure an interface in accordance with the specifications of interface elements.

14. The method to facilitate multi-system integration and cooperative multi-system operations in conformance with adaptive protocols as recited in claim 12, wherein the transmitting the references causes the at least one remote system to transmit the responses in accordance with the specifications of interface elements.

15. One or more non-transitory, machine-readable media having machine-readable instructions thereon which, when executed by one or more processing devices, cause a system to perform operations comprising:

providing content to facilitate a user interface that may be exposed to a plurality of remote systems communicatively couplable with the system, wherein each remote system of the plurality of remote systems is located remotely from the system and is configured to perform different types of operations according to operation requests from a plurality of endpoint devices, and wherein the system is configured to facilitate direct integration with remote systems that exposes a plurality of functionalities and data of the system;

for at least one remote system of the plurality of remote systems:

receiving one or more selections corresponding to the user interface;

defining a partial system integration of the at least one remote system with the system based at least in part on the one or more selections, defining a set of one or more functionalities to be used by the at least one remote system after the partial system integration of the at least one remote system with the system, identifying one or more application programming interfaces (APIs) provided by the system and particularized to facilitating the set of one or more functionalities, and defining a data mapping particularized to facilitating the set of one or more functionalities;

generating integration specifications particularized to facilitating use of the set of one or more functionalities by the at least one remote system after the partial system integration of the at least one remote system with the system;

transmitting the integration specifications to facilitate the partial system integration of the at least one remote system with the system;

detecting one or more system interactions and/or one or more data changes that correspond to a defined event, the defined event mapped to the at least one remote system;

identifying a protocol mapped to the partial system integration that comprises parameter constraints mapped to the defined event;

generating an implementation of the protocol, the implementation of the protocol defining an operation flow that is to occur in response to the detection of the defined event, where the implementation of the protocol transforms the protocol into an executable process corresponding to use of the set of one or more functionalities by the at least one remote system;

performing the operation flow, the operation flow comprising:

transmitting, to the at least one remote system, references to the integration specifications previously transmitted to the at least one remote system;

receiving, from the at least one remote system, responses to the transmitting of the references;

determining whether the responses conform to the parameter constraints of the protocol; and upon determination that the responses satisfy the parameter constraints, controlling access to a resource facilitated by the system in accordance with the protocol.

16. The one or more non-transitory, machine-readable media as recited in claim 15, the method operations further comprising:

receiving target specifications of the at least one remote system to facilitate use of the one or more APIs and/or the partial system integration.

17. The one or more non-transitory, machine-readable media as recited in claim 16, the method operations further comprising:

analyzing the target specifications of the at least one remote system;

wherein the data mapping specifies data fields that need to be transferred and how the data fields map between the system and the at least one remote system.

\* \* \* \* \*